(12) United States Patent
Di Franco

(10) Patent No.: US 8,056,228 B2
(45) Date of Patent: Nov. 15, 2011

(54) ELECTRODES WITH MECHANICALLY ROUGHENED SURFACE FOR ELECTROCHEMICAL APPLICATIONS

(75) Inventor: Dino Floriano Di Franco, Mayfield Village, OH (US)

(73) Assignee: Industrie De Nora S.p.A., Milan (IT)

( * ) Notice: Subject to any disclaimer, the term of this patent is extended or adjusted under 35 U.S.C. 154(b) by 0 days.

(21) Appl. No.: 12/635,055

(22) Filed: Dec. 10, 2009

(65) Prior Publication Data

US 2010/0084266 A1    Apr. 8, 2010

Related U.S. Application Data

(63) Continuation of application No. PCT/EP2008/054660, filed on Apr. 17, 2008.

(60) Provisional application No. 60/912,501, filed on Apr. 18, 2007.

(51) Int. Cl.
*B21D 22/16*     (2006.01)

(52) U.S. Cl. ............. 29/890; 29/592.1; 29/825; 29/829; 72/366.2; 72/82; 72/84; 72/91; 72/94; 72/96; 72/226

(58) Field of Classification Search ............. 204/290.14, 204/283, 284; 29/895, 895.3, 895.31, 895.33, 29/592.1, 825, 829, 890
See application file for complete search history.

(56) References Cited

U.S. PATENT DOCUMENTS

| 5,346,385 | A |   | 9/1994 | Mcaleavey | |
| 6,071,570 | A | * | 6/2000 | Hardee et al. | 205/67 |
| 2003/0107147 | A1 | * | 6/2003 | Thielman et al. | 264/104 |
| 2004/0079130 | A1 | * | 4/2004 | Sugikawa | 72/186 |
| 2005/0258136 | A1 | * | 11/2005 | Kawanishi et al. | 216/54 |
| 2007/0048400 | A1 | * | 3/2007 | Kashiwaya et al. | 425/385 |

FOREIGN PATENT DOCUMENTS

| JP | 63 148542 A | 6/1988 |
| JP | 2005199190 A | 7/2005 |

OTHER PUBLICATIONS

International Search Report for Application No. PCT/EP2008/054660 dated Jul. 25, 2008.

* cited by examiner

*Primary Examiner* — Bruce Bell
(74) *Attorney, Agent, or Firm* — Eschweiler & Associates, LLC

(57) ABSTRACT

The invention relates to a method for roughening the surface of a metal sheet used as electrode support in industrial electrochemical applications, and an electrode made by such method. Mechanical roughening is imparted by skin-passing the sheet between two rollers of a rolling mill, at least one of which is patterned according to a predetermined profile to be transferred by compression to the surface of the metal sheet.

14 Claims, No Drawings

ELECTRODES WITH MECHANICALLY ROUGHENED SURFACE FOR ELECTROCHEMICAL APPLICATIONS

CROSS-REFERENCE TO RELATED APPLICATION

This application is a continuation of PCT/EP2008/054660, filed Apr. 17, 2008, that claims the benefit of the priority date of U.S. Provisional Patent Application No. 60/912,501, filed on Apr. 18, 2007, the contents of which are herein incorporated by reference in their entirety.

FIELD OF THE INVENTION

The invention relates to electrodes for electrochemical applications, with particular reference to metal electrodes for use in electrolytic cells.

BACKGROUND OF THE INVENTION

There are known several industrial electrochemical processes making use of coated metal electrodes. A particularly relevant example is given by a chlor-alkali electrolysis process wherein cells equipped with nickel cathodes and titanium anodes are currently used. In order to decrease the energy consumption, which is a direct function of the cell voltage, a catalytic layer is applied on the nickel and titanium supporting substrates. A similar situation applies to other important electrochemical processes such as water electrolysis, metal electrowinning, electroplating and water treatment, among others. As most electrochemical reactions involve the evolution of gases, subjecting the relevant catalytic layer to a continuous mechanical stress, the adherence of such layer to the metal substrate plays a critical role in obtaining an industrially acceptable service life. It is known to those skilled in the art that the adherence of the catalytic layer is strictly related to the superficial roughness profile of the supporting substrate (hereinafter referred to as "accepting surface"), the roughness working primarily as an anchoring element.

The technical literature discloses several types of treatment for imparting roughness to an accepting surface. One procedure consists of sand or grit-blasting, wherein the metal surface is abraded by an impinging jet of either high pressure air with sand or metal grit, i.e., dry sandblasting, or of high pressure water with sand or metal grit, i.e., wet sandblasting. These treatments inject a substantial amount of energy into the metal structure, with consequent generation of internal stresses. When thin metal sheets are used, for instance of thickness below 1 mm, the internal stresses are likely to produce deformation with consequent loss of planarity. For this reason, dry or wet blasting can be applied only to relatively thick sheets. However, with thick sheets, the mechanical blasting action brings about a substantial hardness increase which may lead to cracks during application of the catalytic layer. A further drawback of this method is represented by the quality of the roughness profile, which is difficult to control and is dependent on a combination of several production parameters, such as size distribution of the sand or grit, pressure of air or water, size of the nozzles, and angle of the jet to the surface. In addition, the accepting surface, once the sand or grit-blasting is completed, is likely to be polluted by particles impinged on the metal which negatively affect the adherence of the catalytic layer. Finally, the sand or grit stock has to be discharged after a certain number of working hours as the particle size decreases with a consequently decreased efficiency of abrasion. The disposal of sand or grit which is polluted with the abraded particles of the treated metal substrates is difficult and expensive.

Other techniques known in the art for imparting roughness to an accepting surface include sand or grit blasting coupled with a first etching in HCl, heat treatment followed by etching, and melt spraying of metals or ceramic oxides allowing growth of a rough layer. Each of these techniques, however, have associated drawbacks.

Thus, it would be desirable to provide a method of pre-treating an accepting surface while avoiding the inconveniences of insufficient cleanliness of the pre-treated surface negatively affecting the adherence of the catalytic layer, the difficulty of predefining the extent of imparted roughness, the lack of reproducibility in the quality of the accepting surface both within the same sample and among the different samples of an industrial production, and the costs of disposal of the exhausted sand or grit stocks and of spent etching baths.

SUMMARY OF THE INVENTION

In one embodiment, the invention is directed to a method for manufacturing an electrode substrate comprising imprinting a surface roughness profile pattern to at least one major surface of a metal sheet by skin-passing said metal sheet between two rollers of a rolling mill, at least one of the rollers being provided with a negative image of said roughness profile pattern.

In another embodiment the invention is directed to a gas-evolving electrode of an electrolysis cell comprising a metal substrate coated with a catalytic layer, said substrate comprising a metal sheet having a surface roughness profile pattern on at least one surface of said metal sheet, wherein the surface roughness profile is provided by skin-passing said metal sheet between two rollers of a rolling mill, at least one of the rollers being provided with a negative image of said roughness profile pattern.

DESCRIPTION

For purposes of the invention, the following terms shall have the following meanings:

The term "a" or "an" entity refers to one or more of that entity; for example, "an anode" refers to one or more anodes or at least one anode. As such, the terms "a" or "an", "one or more" and "at least one" can be used interchangeably herein. It is also to be noted that the terms "comprising," "including," and "having" can be used interchangeably. Furthermore, a compound "chosen from one or more of" refers to one or more of the compounds in the list that follows, including mixtures (i.e. combinations) of two or more of the compounds.

The term "negative image" is defined as a mirror image having substantially the same geometric distribution of protrusions and depressions and the same quality in terms of regularity and reproducibility. The "negative image" is not characterised by the same absolute values of average roughness since a certain degree of elastic return of an accepting surface in the mechanical transfer process must be taken into account.

As it is known in the art, electrical energy consumption is primarily decreased by reducing the cell voltage, which in its turn can be achieved by providing anodes and/or cathodes with suitable catalytic layers capable of facilitating the required electrochemical processes, such as evolution of hydrogen, chlorine or oxygen. The invention is directed to a method for the pre-treatment of metal sheets used as supporting substrates of electrodes to be installed as anodes or cathodes in electrochemical cells where the minimisation of the electrical energy consumption is of utmost importance.

In one embodiment, the invention is directed to a method for imparting a predefined roughness profile on an accepting surface of a metal sheet electrode substrate comprising mechanically transferring a pattern profile by skin-passing the metal sheet in a rolling mill comprised of two rollers. The roughness profile applied to the metal sheet is predetermined by providing a negative image thereof on the surface of at least one roller of the rolling mill.

In the method according to the invention, the accepting surface to be roughened may be made out of any metal suitable for use as the inert substrate of electrodes for electrochemical processes. In the case of chlor-alkali electrolysis, metal electrowinning, electroplating, electrochlorination and water electrolysis, the most commonly employed materials comprise stainless steels, nickel and titanium. Additional metal alloys can be used including chromium-nickel alloys commercialised under the trademarks Incoloy®, Inconel® and Hastelloy®, and the 0.2% palladium/5% tantalum and aluminum-vanadium-tin titanium alloys. Incoloy® and Inconel® are trademarks of INCO Ltd. and Hastelloy® is a trademark of Haynes Ltd.

The catalytic layer comprises noble metals such as platinum, ruthenium, palladium, rhodium and alloys or oxides, carbides, nitrides, carbonitrides, borides and silicides thereof, which may be applied to the substrate accepting surfaces by means of methods known in the art, including galvanic methods or thermal decomposition of paints containing suitable precursors carried out at temperatures ranging from 300° C. to 600° C. in multiple steps. For each step, the thermal curing has a typical duration of a few minutes, with an optional final thermal treatment up to an hour or more.

The performances of these types of electrodes clearly depend, among other characteristics, on the adherence of the catalytic layer to the accepting surface which, regardless of the selected type of metal or alloy, is a function of a number of properties of the accepting surface, and in particular of the cleanliness and the degree of surface roughness. As regards cleanliness, foreign materials impinged in the accepting surface may be dissolved and diffuse into the catalytic layer during the coating application steps with possible deterioration of the electrochemical performances and they may even affect the adherence of the layer, which is strictly related to the roughness profile. Thus, a cleaned surface may be obtained by any of the treatments known in the art to achieve a clean metal surface, including one or more of mechanical cleaning, chemical or electrolytic degreasing or other chemical cleaning operation.

The peak-to-valley height of the roughness profile is one of the critical parameters affecting the adherence of the catalytic layer, an additional one being the average number of peaks (or valleys) per unit of length measured, for example, along two directions, such as the lamination direction of the metal sheet to be roughened and the direction orthogonal thereto. The peak-to-valley height is quantified by the average roughness (Ra) expressed as the arithmetic average of the absolute deviations from the average surface level. In one embodiment, it has been found that a minimum Ra value of at least 1 micrometer ($\mu$m) is necessary to prevent significant loss of adherence of the catalytic layer. In another embodiment, such as in the case of oxygen evolving electrodes, higher Ra values of above 5 micrometers, ensure the desired adherence and provide an increase in the specific active area where the electrochemical reaction takes place or, in other words, in order to decrease the local effective current density, also implying a decreased local gas evolution and a lower mechanical stress applied to the catalytic layer. The average number of peaks (or valleys) per unit length, or peak frequency, comprises at least 15 peaks per cm measured both along the direction of lamination of the metal sheet substrate and along the direction orthogonal thereto.

According to an embodiment of the invention, the above defined roughness features of the accepting surface are produced by skin-passing the sheet in a rolling mill between two rollers, at least one of which rollers is provided with a suitable roughness profile pattern. The negative image of the selected roughness profile to be applied is produced on a surface of at least one roller by means of various methods, including blasting with sand or grit, photoetching or laser inscribing, such pattern representing the negative image of the roughness profile selected for the metal sheet. In one embodiment, when both sides of the sheet must be roughened, both rollers will be patterned accordingly. In another embodiment, when the controlled roughness profile is required only on one side, only one patterned roller will be used, in cooperation with a smooth roller. Where general roughness profile parameters such as the peak-to-valley size of the surface protrusions is of concern, the sand or grit technique is applicable.

Where a specific geometry of the peaks and valleys, for instance an arrangement of square-based pyramids or other specific geometries, is desired, photoetching and laser inscribing methods are applicable. As the profile pattern of the at least one patterned roller is transferred to the metal sheet by compression, the geometric features of the relevant profile pattern are transferred to the metal sheet so that the quality of the roughness profile imparted to the metal sheet is completely reproducible within the same sheet and among the various sheets during the industrial manufacturing process.

As regards the Ra value, it has been found that skin-passing between the two rollers usually leads to a roughness profile characterised by Ra values ranging between 60% and 80% of the Ra value of the at least one patterned roller, a value which is substantially affected by the nature and metallurgical condition of the accepting surface. Optionally, more than one single pass, for instance two or three passes, may be needed in the rolling mill to achieve the desired Ra values of the metal sheet. It has also been found that if both rollers are provided with the same roughness profile pattern, that is with patterns having the same Ra and peak frequency and the same distribution of peak-and-valley population, then the metal sheet comes out of the skin-passing operation in a perfectly flat condition (symmetric roughening). When the symmetric roughening is applied to the metal sheet, the planarity is also maintained without any significant deformation even after the thermal cycles required for the application of the catalytic layer. This result is especially important when the metal sheet to be roughened is a thin metal sheet, for instance a sheet having a thickness of 0.5 mm or less. As it is known to those of skill in the art, this type of sheet cannot be subjected to the necessary roughening required to ensure the best adherence of the catalytic layer by means of sand or grit-blasting as the energy of the pressurised blasting jet would cause a severe deformation, which deformation increases during the thermal treatment associated with the catalytic layer application. The only possibility for producing the required roughness profile is represented by etching treatments requiring the dipping of the thin metal sheets in aggressive baths for prolonged period. These procedures present the inconveniences of an often unacceptable thinning, which weakens the sheet making handling difficult, and of a rapid exhaustion of the baths with soaring costs for their disposal.

The practical experience coming from the mechanical roughening of various lots of metal sheets has taught that the profile pattern of the rollers may be worn off during the operation of skin-passing, the decaying rate being a direct function of the extent of surface hardness increase induced in the metal sheet during the compression required to transfer the pattern profile of the rollers. For example, in the skin-passing of a 0.5 mm nickel sheet 200 (UNS N02200) with rollers having a roughness profile characterised by a Ra value of 30 micrometers and a peak frequency of 40 peaks per cm along both the lamination and the orthogonal direction, the Vickers hardness increased from a value of 120 HV of the annealed sheet as supplied, up to 165 HV. A similar behaviour was found when skin-passing a 0.5 mm sheet of grade 1 titanium according to ASTM B 265.

It has also been found that the lifetime of the rollers can be substantially increased as required by the economics of the industrial production if the surface hardness of the rollers is reasonably high. As the imprinting of the roughness profile on a hard surface may be difficult, it has been found that the patterning of the rollers can be advantageously obtained by means of a multiple step procedure. In one embodiment, in a first step the selected roughness pattern is imprinted while the construction material of the rollers is in a first metallurgical condition having a sufficiently low hardness value, and in a second step the construction material of the rollers is brought to a second metallurgical condition wherein the surface hardness is increased to higher values. In one embodiment, the surface hardness of the second metallurgical condition is above 300 HV, and in another embodiment 500 HV, so that the wear action of the skin-passing operation becomes almost negligible. Such a result may be accomplished in a number of ways as known to those skilled in the art. Suitable means for increasing the surface hardness of the rollers without affecting the previously applied roughness profile pattern include and are not limited to suitable heat treatments, chrome plating or chemical treatments of the rollers. Heat treatment for increasing hardness applies in particular to rollers made of precipitation hardening steels such as UNS S13800, S14800, S15700, S17400 and S 17700. These steels comprise elements such as aluminium and niobium which can be kept in solid solution (low hardness condition) during the imprinting of the roughness profile pattern and then precipitated by means of a proper heat treatment leading to the formation of microparticles dispersed inside the solid structure (high hardness condition).

Another option for obtaining the desired level of hardness is a chemical treatment whereby the surface of the rollers is enriched with suitably diffused elements, in particular carbon and/or nitrogen. This result may be obtained by treating the rollers at a suitable temperature in the presence of a carburising gas, such as methane or a carbon monoxide-containing mixture, or of a nitridating gas such as ammonia. The rollers can also be hardened by a chrome plating of suitable thickness, capable of imparting the required anti-wear properties without affecting the roughness profile to an excessive extent.

Once the rollers with the desired roughness pattern are prepared in the appropriate manner, they can be installed in a suitable rolling mill and mechanically roughened metal sheets with a substantially equivalent roughness profile can be easily produced. The entire operation may be carried out at the production mill so that metal sheets having a predefined and highly reproducible superficial roughness profile can be provided to the electrode manufacturers, resulting in a substantially simplified and far less expensive process.

EXAMPLE 1

A 0.5 mm sample sheet of nickel 200 (UNS N02200) was skin-passed through two patterned rollers made of precipitation hardening steel under a pressure of 500 tonnes. Prior to installation in the rolling mill, the rollers were provided with a roughness profile pattern by blasting with iron gravel GL 18 with pressurised air at suitable flow-rate, as would be known to one skilled in the art. The roughness profile pattern was measured along two directions with a Hommel T1000 C mechanical profilometer manufactured by Hommelwerk GmbH, namely the lamination direction of the sheet and a direction orthogonal thereto. The pattern was characterised by a Ra value of 21 micrometers and a peak frequency of 18 peaks per cm. After the roughening step, the rollers were hardened by means of a heat treatment, after which a HV value of 390 was measured. The profile pattern of the rollers was again checked and no significant changes of the Ra value and peak frequency were detected.

After skin-passing, the Ra and the peak frequency of the nickel sheet were respectively 15 micrometers and 17 peaks per cm. The measurements were repeated at distances of 30 cm over the entire surface of the sheet with negligible Ra value and peak frequency deviations. No appreciable thickness reduction was detected.

EXAMPLE 2

A 0.5 mm sheet of grade 1 titanium according to ASTM B 265 was skin-passed in a rolling mill equivalent to the one of Example 1, equipped with two patterned rollers made of surface-hardened steel under a pressure of 500 tonnes. Prior to installation in the rolling mill, the rollers were provided with a roughness profile pattern by blasting with iron gravel GL 18 with pressurised air at suitable flowrate, as would be known to one skilled in the art. The roughness profile pattern was measured with a Hommel T1000 C mechanical profilometer manufactured by Hommelwerk GmbH along two directions, namely the lamination direction of the sheet and a direction orthogonal thereto. The pattern was characterised by a Ra value of 40 micrometers and a peak frequency of 60 peaks per cm. After the roughening step, the rollers were hardened by means of a surface chemical treatment in a carburising atmosphere comprising a mixture of carbon monoxide and carbon dioxide. Upon completion of the treatment, a hardness value of 430 HV was measured. The roughness profile pattern of the rollers was again checked and no significant changes of the Ra value and peak frequency were detected.

After skin-passing, the Ra and the peak frequency of the titanium sheet were respectively 28 micrometers and 57 peaks per cm. The measurements were repeated at distances of 20 cm over the entire surface of the sheet with negligible Ra value and peak frequency deviations. No thickness reduction could be detected.

EXAMPLE 3

Samples of 35 cm×35 cm size were cut from the nickel and titanium sheets of Examples 1 and 2 and activated with catalytic layers as indicated below:

The nickel samples were first subjected to a pickling in 10% hydrochloric acid at 80° C. for 2 minutes, for cleaning purposes. A catalytic layer of a mixed ruthenium and nickel oxide was applied by painting an aqueous solution comprising ruthenium trichloride and nickel dichloride and subsequent thermal decomposition in an oven with forced air circulation. The painting and thermal decomposition steps were repeated five times until obtaining a noble metal loading of 12 g/m$^2$. The activated samples were cut into coupons. Randomly selected coupons of 3.5 cm×3.5 cm size were subjected to an adhesion test with adhesive tape in accordance with the so-called "Scotch Tape test" (ASTM D3359, Test Method B) commonly used as quality standard for the industrial production of electrodes as known to those skilled in the art. Satisfactory results were obtained in all cases. The remaining coupons were installed as cathodes in chlor-alkali laboratory membrane cells and operated under a current density of 8000 A/m$^2$ at 90° C. After 10 months of continuous operation the coupons were extracted from the cells and again subjected to the Scotch Tape test with satisfactory results.

The titanium samples were subjected to a pickling in 15% hydrochloric acid at 90° C. for 3 minutes, for cleaning purposes. A catalytic layer consisting of ruthenium and titanium oxides was applied by painting an aqueous solution comprising ruthenium trichloride and titanium tetrachloride and subsequent thermal decomposition in an oven with forced air circulation. The painting and thermal decomposition steps were repeated seven times until obtaining a noble metal loading of 13 g/m$^2$. The activated samples were cut into coupons. Some randomly selected coupons were subjected to the Scotch Tape test as above. Satisfactory results were obtained in all cases. The remaining coupons were installed as anodes in electrochlorination undivided cells and operated under a current density of 2000 A/m$^2$ at 30° C. in a 3% sodium chloride solution. After 400 hours of continuous operation the coupons were extracted from the cells and again subjected to the Scotch Tape test with satisfactory results.

The above description shall not be understood as limiting the invention, which may be practised according to different embodiments without departing from the scope thereof, and whose extent is exclusively defined by the appended claims.

The invention claimed is:

1. A method for manufacturing a gas-evolving electrode substrate of an electrolysis cell comprising imprinting a surface roughness profile pattern to at least one major surface of a metal sheet by skin-passing said metal sheet between two rollers of a rolling mill, at least one of the rollers being provided with a negative image of said roughness profile pattern.

2. The method according to claim 1, wherein said surface roughness is uniform in a direction of lamination of said metal sheet substrate and in a direction orthogonal thereto.

3. The method according to claim, 2 wherein said two rollers are provided with said roughness profile pattern.

4. The method according to claim 2, wherein said roughness profile pattern comprises a minimum Ra value of at least 1 micrometer and a peak frequency of at least 15 peaks per cm.

5. The method according to claim 1, wherein said negative image of said roughness profile pattern comprises a sand blasted, grit blasted, photoetched or laser inscribed negative image.

6. The method according to claim 5, wherein said negative image of said roughness profile pattern is produced on said at least one roller in a first metallurgical condition, and said patterned roller is subsequently brought to a second metallurgical condition by a hardening treatment.

7. The method according to claim 6, wherein said at least one roller is made of a precipitation hardening steel and said hardening treatment is a thermal treatment.

8. The method according to claim 6, wherein said hardening treatment is a surface chemical treatment comprising heating said at least one roller in the presence of a nitridating or a carburising gas.

9. The method according to claim 8 wherein said nitridating gas is ammonia.

10. The method according to claim 8, wherein said carburising gas comprises one or more of methane, carbon monoxide, and optionally, $CO_2$.

11. The method according to claim 6, wherein said hardening treatment comprises chrome plating.

12. The method according to claim 6, wherein the surface hardness of said at least one roller in said second metallurgical condition is above 300 HV.

13. The method according to claim 12, wherein said surface hardness is above 500 HV.

14. The method according to claim 1, wherein said metal sheet comprises one or more of titanium, nickel and alloys thereof, stainless steel, chromium-nickel alloys, palladium-tantalum alloys, and aluminum-vanadium-tin-titanium alloys.

* * * * *